(12) United States Patent
Börker et al.

(10) Patent No.: US 7,084,711 B2
(45) Date of Patent: Aug. 1, 2006

(54) METHOD AND APPARATUS FOR SCANNING A DATA SIGNAL BASED ON A DIRECTION OF PHASE DIFFERENCE

(75) Inventors: Philipp Börker, Berlin (DE); Dirk Scheideler, Munich (DE)

(73) Assignee: Infineon Technologies AG, Munich (DE)

( * ) Notice: Subject to any disclaimer, the term of this patent is extended or adjusted under 35 U.S.C. 154(b) by 12 days.

(21) Appl. No.: 10/877,149

(22) Filed: Jun. 25, 2004

(65) Prior Publication Data

US 2005/0012834 A1 Jan. 20, 2005

(30) Foreign Application Priority Data

Jun. 25, 2003 (EP) ................................ 103 28 566

(51) Int. Cl.
*H03D 3/24* (2006.01)

(52) U.S. Cl. ........................................ 331/45; 375/375
(58) Field of Classification Search ................. 331/45; 375/375

See application file for complete search history.

(56) References Cited

U.S. PATENT DOCUMENTS

| | | | | |
|---|---|---|---|---|
| 5,684,805 A * | 11/1997 | Brown | ........................ | 370/518 |
| 5,889,436 A * | 3/1999 | Yeung et al. | ................... | 331/2 |
| 6,075,408 A | 6/2000 | Kullstam et al. | ........... | 329/304 |
| 6,373,911 B1 * | 4/2002 | Tajima et al. | ................ | 375/375 |
| 6,859,106 B1 * | 2/2005 | Sano | .......................... | 331/1 A |
| 2002/0114416 A1 * | 8/2002 | Enam et al. | ................. | 375/373 |

* cited by examiner

*Primary Examiner*—Joseph Chang
(74) *Attorney, Agent, or Firm*—Maginot, Moore & Beck

(57) ABSTRACT

A method and an apparatus for scanning a data signal are provided whereby a plurality of scanning signals (P0, P1, P2, P3) delayed successively by a respective phase difference are generated, for example, by a quadrature oscillator (1). A first data signal (D) is scanned with these scanning signals (P0–P3) in order to generate a plurality of second data signals (D0–D3). Because the direction of rotation of the quadrature oscillator (1) can vary, depending on random starting conditions, the direction of rotation is determined by means of phase detectors (4). These phase detectors (4) are preferably connected to the outputs of the clock dividers (3). Depending on the direction of rotation determined, the second data signals (D0–D3) are allocated to output channels (A0–A3) by a change-over unit (6).

22 Claims, 2 Drawing Sheets

METHOD AND APPARATUS FOR SCANNING A DATA SIGNAL BASED ON A DIRECTION OF PHASE DIFFERENCE

FIELD OF THE INVENTION

The present invention relates to a method and an apparatus for scanning a data signal. In particular, the present invention relates to a method and an apparatus for scanning a data signal with the aid of scanning signals, the scanning signals being delayed successively with respect to one another by a respective phase difference, the direction or sign of these phase differences being, however, unknown.

BACKGROUND

Oscillators having a plurality of clock phases are frequently used for scanning received data in receiver circuits. In the case of serial high-speed transmitter/receiver chips (transceivers), in particular so-called quadrature oscillators, which emit four scanning signals offset successively by 90° in each case, are used for this purpose. However, widely-used basic circuits of these quadrature oscillators have the disadvantage that, because of random processes when starting, the direction of rotation of the oscillators may be either anticlockwise or clockwise.

This problem of the different directions of rotation is represented in FIGS. 1A and 1B using the example of a quadrature oscillator. In FIG. 1A scanning signals P0, P1, P2 and P3 outputted by such a quadrature oscillator over time t are represented. The signals are offset successively to one another by 90° or a quarter of a period. The direction of rotation is indicated by an arrow R.

In FIG. 1B, by contrast, the scanning signals P0–P3 of a quadrature oscillator rotating anticlockwise are illustrated, as indicated by an arrow L. On closer inspection of FIGS. 1A and 1B it is noticeable that a reversal of the direction of rotation corresponds to a transposition of signals P1 and P3.

In principle, scanning of the data is possible with both directions of rotation. However, because a change of direction of rotation also causes a change of the corresponding data signals scanned with the scanning signals, in the example illustrated the scanned data signals belonging to the scanning signals P1 and P3 would also be transposed. This makes defined processing of the respective scanned data signals impossible.

It is therefore an object of the present invention to provide a method and an apparatus with which a defined data output is achieved even with the use of scanning signals which are phase-offset to one another in an unknown direction.

SUMMARY

This object is achieved by a method and apparatus according to embodiments of the present invention.

According to the invention, it is proposed to generate a plurality of scanning signals delayed successively by a respective phase difference and to scan a first data signal with the scanning signals in order to generate a plurality of second data signals, a direction of at least one phase difference between two scanning signals of the plurality of scanning signals being determined and, in dependence on said at least one phase difference direction, the second data signals being allocated to respective output channels.

By determining the direction of the phase difference between two scanning signals a direction of rotation, for example, of a quadrature oscillator, can be detected and the second data signals can be allocated to the output channels according to the direction of rotation.

The direction of the phase difference is preferably determined by a comparison of two signals derived from the two scanning signals by a reduction of a clock frequency. Such signals with reduced clock frequency are generally present in any case in such circuits since they are used to reduce a clock frequency of the second data signals. Because these signals are also used to determine the phase difference direction, phase detectors, for example, used for this purpose need to be designed only for a correspondingly reduced speed and therefore consume less power and chip area. In addition, the phase difference direction is not determined directly by means of the scanning signals, which are generated, for example, by a quadrature oscillator, and therefore influences the quality of the scanning signals hardly or not at all.

The allocation of the second data signals to the respective output channels may occur, for example, simply by interchanging the corresponding data signals in dependence on the defined phase difference direction. Self-evidently, the present invention can also be used to determine a plurality of directions of phase differences between different pairs of scanning signals in order, for example, to increase detection accuracy when detecting the direction of rotation of the oscillators.

The invention is elucidated in more detail below with reference to a preferred embodiment and to the appended drawings, in which:

DETAILED DESCRIPTION

Figure 1A:
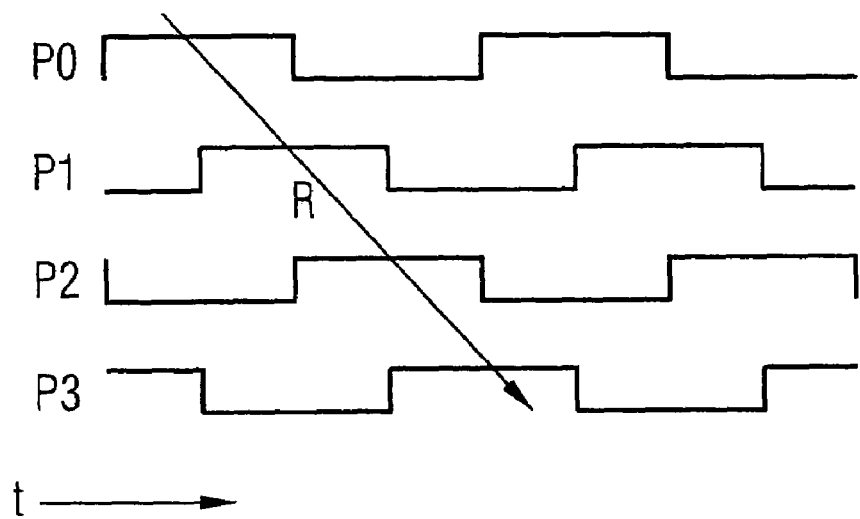
FIG. 1A shows scanning signals generated by a quadrature oscillator rotating clockwise.
Figure 1B:
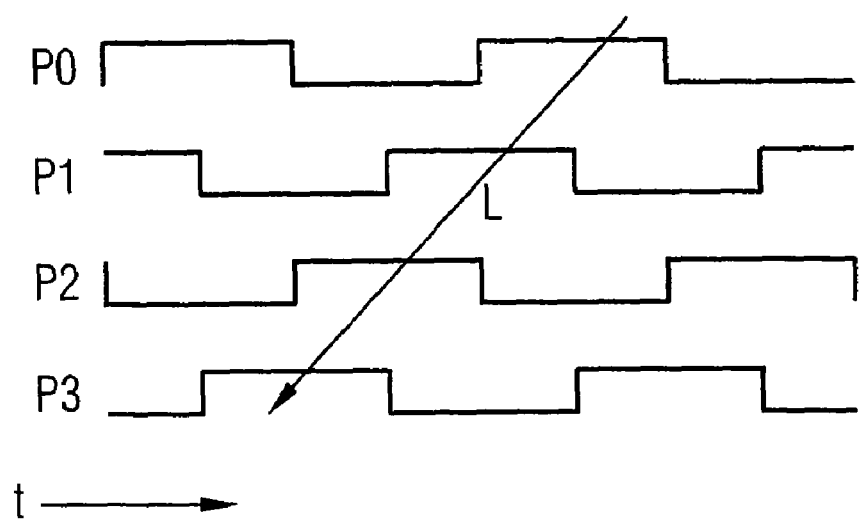
FIG. 1B shows scanning signals generated by a quadrature oscillator rotating anticlockwise.
Figure 2:
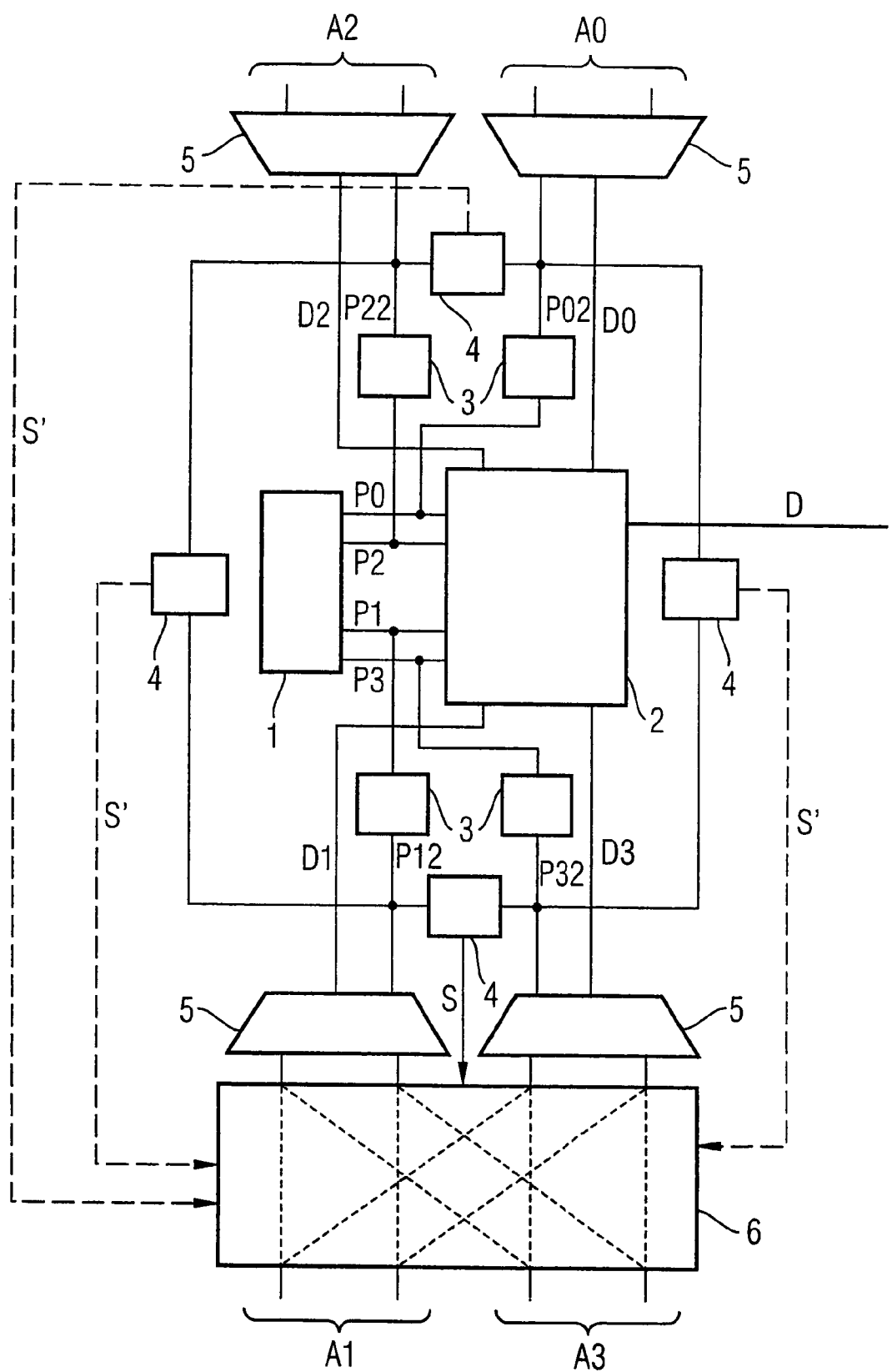
FIG. 2 shows an embodiment of an apparatus according to the invention.

FIG. 2 shows an embodiment of an apparatus according to the invention for data scanning. A quadrature oscillator 1 generates four scanning signals P0, P1, P2 and P3 which are supplied to a scanning register 2. The scanning signals P0–P3 are offset successively through 90° to one another, the output being able to occur both clockwise as in FIG. 1A and anticlockwise as in FIG. 1B, depending on random processes while starting the quadrature oscillator 1. It is assumed below that the oscillator is to be clockwise-rotating, so that a correction is required in the case of anticlockwise rotation.

It should be pointed out that the apparatus and the method according to the invention can be used not only with a quadrature oscillator of this kind but, in principle, with any scanning signals for which the direction of phase-offset to one another is unknown or is not fixed at the start.

Also supplied to the scanning register 2 is a first data signal D which is scanned with the scanning signals P0–P3. Second data signals D0, D1, D2 and D3 are generated by this scanning process, the second data signal Dn (n=0–3) corresponding to the first data signal D scanned with the scanning signal Pn.

In this case, the scanning signals are used for time-offset parallel scanning of the received first data signal D. If the direction of rotation of the quadrature oscillator 1 is now reversed, this corresponds, as explained above, to a transposition of the scanning signals P1 and P3 and therefore to a transposition of the second data signals D1 and D3. The data which are supposed to appear at the output of the scanning register controlled by P1 then appear, in the case of the "wrong" direction of rotation, at the output of the scanning register clocked by P3 and vice versa.

The second data signals D0–D3 are reduced to lower data rates by respective demultiplexers 5. This can take place in a plurality of stages; only the first demultiplexer 5 of the demultiplexer trees which would then be necessary is shown in the illustration. The outputting of each second data signal D0–D3 takes place in a corresponding output channel A0–A3.

To control the demultiplexers 5, which divide the respective data signal into two data signals in each case, the clock frequencies of the scanning signals P0–P3 are halved with clock dividers 3, so that derived scanning signals P02–P03 with halved clock rates are produced. These scanning signals are supplied to the demultiplexers 5 for selection.

In addition, two each of the scanning signals with halved clock rate are supplied to a phase detector 4. In the embodiment illustrated the wiring here is symmetrical, i.e. one derived scanning signal is supplied in each case to two phase detectors 4.

As this happens, the phase detector 4 to which the derived scanning signals P12 and P32 are supplied transmits a control signal S, which includes information on the phase difference of the derived scanning signals P12 and P32, to a change-over unit 6. Because, as can be seen in FIGS. 1A and 1B, the scanning signals P1 and P3 have a phase difference of 180°, the derived scanning signals P12 and P32 have a phase difference of +90° or −90°. If the output of the clock divider 3 takes place with a defined starting state, the sign of the phase difference between the derived scanning signals P12 and P32 is characterising for the direction of rotation of the quadrature oscillator 1, i.e. this direction of rotation can be deduced solely from the control signal S.

If no such defined starting state is present, the further control signals S' (indicated by broken lines) from the other phase detectors 4 are additionally required. A combinatorial logic in the change-over unit 6 can be used to determine the direction of rotation of the quadrature oscillator 1 from the control signals S, S'. Depending on the direction of rotation, the change-over unit 6 allocates the signals D1 and D3, or the signals derived therefrom after the demultiplexers 5, to the output channels A1 and A3. If the direction of rotation of the quadrature oscillator 1 is clockwise, the signals are transmitted onwards along the vertical broken lines in the change-over unit 6; if, however, the direction of rotation is anticlockwise a change-over takes place and the signals are allocated along the oblique broken lines, i.e. the signals derived from the second data signal D3 and from the first data signal D1 are supplied to output channel A1 and output channel A3 respectively.

In principle, it would also be possible to carry out the phase detection directly at the outputs of the quadrature oscillator 1. However, because of the high speed of the scanning signals P0–P3 (typically approximately 10 gigahertz) in transceiver applications, such a phase detector would also have to be very fast. For example, a large, i.e. fast D flip-flop, but therefore one with very high current consumption, could be used. Through the evaluation of the derived scanning signals P02–P32 as in the present embodiment, however, it is possible to use smaller, simple D flip-flops which have a lower power and chip area requirement. In principle, phase detection is also possible at a later stage of multiplexing with still slower signals.

As described above, with an appropriately defined starting state of the clock divider 3, it would be possible to use only a single phase detector 4. This would also be possible if the phase were determined directly at the quadrature oscillator 1. However, this would entail asymmetry in the configuration of the oscillator, which could result in reduced quality of the scanning signals. It is therefore advantageous to use symmetrical wiring, in the present case with four phase detectors.

The invention claimed is:

1. A method for scanning a data signal, the method comprising:
    generating a plurality of scanning signals delayed successively by a respective phase difference, a first data signal being scanned with the scanning signals in order to generate a plurality of second data signals, each second data signal corresponding to the first data signal scanned with one of the scanning signals,
    determining a direction of at least one phase difference between two scanning signals of the plurality of scanning signals and,
    allocating the second data signals to respective output channels, said allocation depending on the direction of the at least one phase difference.

2. The method of claim 1 wherein the direction of the at least one phase difference between the two scanning signals of the plurality of scanning signals is unknown prior to the step of determining the direction of the at least one phase difference.

3. The method of claim 1 wherein the number of output channels is equal to the number of second data signals.

4. The method according to claim 1, wherein the determining step further comprises comparing two signals derived from two scanning signals, each of the two scanning signals generated in accordance with a clock frequency, the two signals derived from the two scanning signals using a reduced clock frequency, the reduced clock frequency comprising a reduction of the clock frequency.

5. The method according to claim 4, further comprising dividing a first of the second data signals into two data signals having the reduced clock frequency using at least one of the two signals derived from the two scanning signals.

6. The method according to claim 1, wherein said allocating step further comprises transposing at least data signals of the second data signals on respective output channels in dependence on the determined direction of the phase difference.

7. The method according to claim 1, wherein the phase differences between phase adjacent scanning signals are substantially the same.

8. The method according to claim 1, wherein the phase differences between phase adjacent scanning signals have the same sign.

9. The method according to claim 1, wherein generating the plurality the scanning signals further comprises generating the plurality of scanning signal using a quadrature oscillator.

10. An apparatus for scanning a data signal, comprising:
    means for generating a plurality of scanning signals delayed successively by a respective phase difference,
    means for scanning a first data signal with the scanning signals in order to generate a plurality of second data signals, each second data signal corresponding to the first data signal scanned with one of the scanning signals, means for determining a direction of at least one phase difference between two scanning signals of the plurality of scanning signals, and means for allocating the second data signals to respective output channels depending on the direction of the at least one phase difference.

11. An apparatus according to claim 10, wherein the means for generating includes a quadrature oscillator.

12. An apparatus according to claim 10, wherein the means for determining includes at least one phase detector.

13. An apparatus according to claim 10, further comprising means for reducing a clock frequency of the second data signals, said means for reducing including inputs connected to outputs of the means for scanning and outputs connected to the output channels.

14. An apparatus according to claim 13, further comprising at least one clock divider operable to reduce a clock frequency of the scanning signals, the at least one clock divider operably connected to a source of a clocking signal, and further operably connected to provide a divided clocking signal to the means for determining.

15. An apparatus according to claim 14, wherein the at least one clock divider is operably connected to provide the divided clocking signal to the means for reducing.

16. An apparatus according to claim 14, wherein the clocking signal comprises at least one of the scanning signals.

17. An apparatus according to claim 14, wherein at least one of the group consisting of the means for determining or the at least one clock divider are wired symmetrically in relation to outputs of the means for generating.

18. An apparatus for scanning a data signal, comprising
an oscillator circuit operable to generate a plurality of scanning signals delayed successively by a respective phase difference, a scanning register operable to scan a first data signal with the scanning signals in order to generate a plurality of second data signals, each second data signal corresponding to the first data signal scanned with one of the scanning signals, a detector circuit operable to determining a direction of at least one phase difference between two scanning signals of the plurality of scanning signals, and an allocation circuit operable to allocate the second data signals to respective output channels depending on the direction of the at least one phase difference.

19. An apparatus according to claim 18, wherein the oscillator circuit includes a quadrature oscillator.

20. An apparatus according to claim 18, wherein the detector circuit includes at least one phase detector.

21. An apparatus according to claim 18, further comprising a demultiplexer operable to receive a clocking signal having a clocking frequency associated with the scanning signals, the demultiplexer operable to reduce a clock frequency of the second data signals at the output channels using the clocking signal.

22. An apparatus according to claim 21, further comprising at least one clock divider operable to reduce a clock frequency of the scanning signals to generate the clocking signal.

* * * * *

UNITED STATES PATENT AND TRADEMARK OFFICE
CERTIFICATE OF CORRECTION

PATENT NO. : 7,084,711 B2  Page 1 of 1
APPLICATION NO. : 10/877149
DATED : August 1, 2006
INVENTOR(S) : Boerker et al.

It is certified that error appears in the above-identified patent and that said Letters Patent is hereby corrected as shown below:

Title page, should read as follow:
Item [30] Priority Data: --DE 103 28 566--

Signed and Sealed this

Eleventh Day of September, 2007

JON W. DUDAS
*Director of the United States Patent and Trademark Office*